March 11, 1952 H. J. FINDLEY 2,588,508

THERMOELECTRIC GENERATOR

Filed Aug. 26, 1949 5 Sheets-Sheet 1

INVENTOR.
HOWARD J. FINDLEY

BY McDonald & Teague

ATTORNEYS

March 11, 1952 H. J. FINDLEY 2,588,508

THERMOELECTRIC GENERATOR

Filed Aug. 26, 1949 5 Sheets-Sheet 2

*INVENTOR.*
HOWARD J. FINDLEY

*BY* McDonald & Teagno

ATTORNEYS

March 11, 1952 H. J. FINDLEY 2,588,508

THERMOELECTRIC GENERATOR

Filed Aug. 26, 1949 5 Sheets-Sheet 3

*INVENTOR.*
HOWARD J. FINDLEY

*BY* McDonald & Teagno

ATTORNEYS

INVENTOR.
HOWARD J. FINDLEY
BY McDonald & Teagno
ATTORNEYS

March 11, 1952 H. J. FINDLEY 2,588,508

THERMOELECTRIC GENERATOR

Filed Aug. 26, 1949 5 Sheets-Sheet 5

*INVENTOR.*
HOWARD J. FINDLEY

*BY* McDonald & Teagno

ATTORNEYS

Patented Mar. 11, 1952 2,588,508

UNITED STATES PATENT OFFICE 2,588,508

THERMOELECTRIC GENERATOR

Howard J. Findley, Chardon, Ohio, assignor to Eaton Manufacturing Company, Cleveland, Ohio, a corporation of Ohio Application August 26, 1949, Serial No. 112,603

18 Claims. (Cl. 136—4)

This invention relates to the generation of electricity and more particularly to thermoelectric generators embodying novel structural features for the generation thereof.

Broadly the invention comprehends the provision of a thermoelectric generator comprising a pair or pairs of vertical banks of thermocouples, the hot junctions of which are disposed toward one another with fuel burning tubes extending vertically therebetween, said thermocouples and burner tubes being simple of construction and assembly providing ease in the servicing and replacement thereof.

An object of the invention of a thermoelectric generator utilizing oil, gas or similar fuel as the combustible heating medium for the thermocouples thereof, that embodies structure for facilitating the servicing, repair or replacement of parts thereof wherein the major burner and thermocouple elements can be readily and easily removed from their incorporated structure.

Another object of the invention is the provision of a thermoelectric generator of high capacity output comprising basically a pair of vertical banks of thermocouples so arranged relative to one another and to a vertical burner apparatus therefor providing a practical construction for high efficiency electrical generation and easy maintenance.

A further object of the invention is the provision of a thermoelectric generator comprising a pair of vertical banks of thermocouples arranged in parallel array to one another with their hot junctions disposed toward one another and their cold junctions extending outwardly oppositely disposed to one another, and a plurality of burner tubes extending vertically between the thermocouples for supplying a flame to the hot junctions thereof, said banks of thermocouples and burner tubes each assembled as a unit and mounted in predetermined spaced relation on a simple supporting framework therefor from which they can be readily removed as requirements necessitate for the servicing thereof.

A yet further object of the invention is the provision of a thermoelectric generator wherein the thermocouples are formed of joined ribbon stock and mounted in vertical tiers or rows supported and spaced intermittently in their vertical arrangement by ceramic or other like refractory material elements so as to afford a sturdy structure especially wherein as here the thermocouples are of a reasonably large size. The thermocouple banks together with the supporting framework serve to form a combustion chamber therebetween in which the burner tubes are located, with secondary air for the combustion chamber being supplied through spaces provided between the rows of thermocouples.

Other and further important objects and advantages of this invention will be apparent from the following description taken in connection with the drawings forming a part of the specification and in which.

Figure 1:
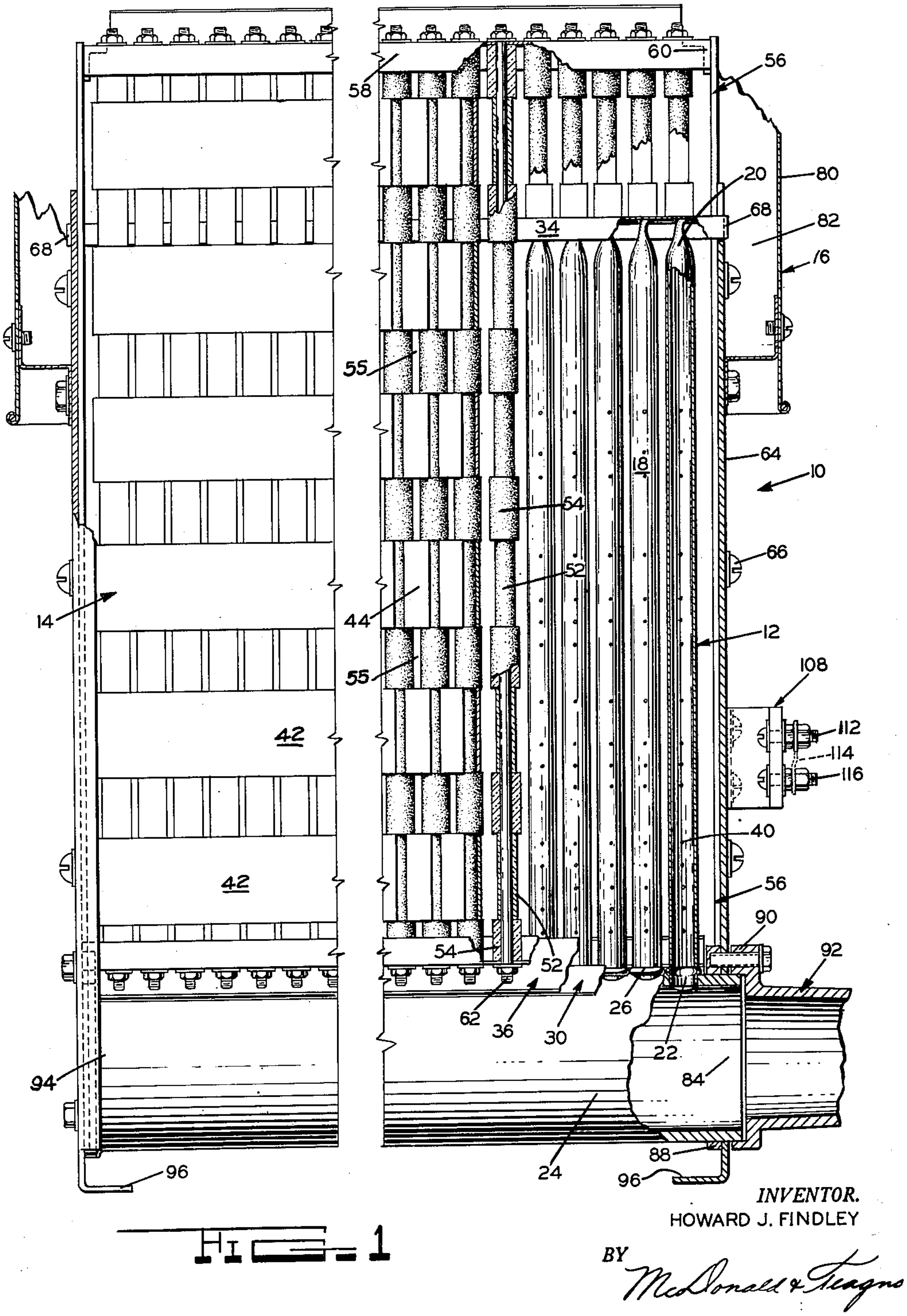
Fig. 1 is a side elevation view of a thermoelectric generator constructed according to the present invention, the generator being shown fragmentarily with portions thereof broken away, other portions in section and still other portions incomplete.

The presently devised thermoelectric generator is directed at the provision of a unit of reasonably high wattage capacity that is sturdy in construction for prolonged use and which can be serviced with a minimum of effort and time. This generator is so constructed as to provide for maximum combustibility in the use of a gaseous or liquid fuel as the heating medium therefor so as to provide for a high efficiency output of the thermocouples thereof. The structure consists basically of a plurality of vertically supported burner tubes having fuel emission openings extending in axial array on the tube on diametrically opposite sides thereof having an inlet manifold in communication with all the tubes at one end thereof, a plurality of thermocouple banks having a plurality of horizontal rows of thermocouples secured therein mounted in vertical array on opposite sides of the burner tubes with the hot junctions thereof directed toward the fuel emission openings in the tubes, vertically disposed plates supporting the burner tubes and thermocouple banks in predetermined spaced relation to one another, an adjustable baffle for the combustion chamber formed y the thermocouple banks with the burner tubes therebetween, and a draft stack for affording proper controlled draft in the combustion chamber and enclosure of a predetermined group of cold junctions in the thermocouple banks.

This application constitutes a continuation-in-part of my copending application Serial No. 521,642 filed February 2, 1944, now Patent No. 2,480,404.

Referring to the drawings for more specific details of the invention 10 represents generally a thermoelectric generator comprising a burner element 12, a pair of thermocouple banks or stacks 14, and a draft stack 16.

The burner element 12 consists of a plurality of identical burner tubes 18 having a closed end 20 and an open end 22 supported in vertical single file array upon a fuel inlet manifold 24 with the open end 22 in communication internally of the manifold.

The open end of each tube has an annular radially outwardly directed rib 26 near the extremity thereof permitting of the clamping of the tubes, to the manifold with the ends 22 thereof received one in each of a plurality of openings 28 provided in straight line array in the manifold, by a clamp member 30 made of two identical half sections 31 having a plurality of openings 32 when assembled together, corresponding to the openings in the manifold for receipt of tubes therein between the half sections such that the ribs 26 of the respective tubes are held between the clamp member 30 and manifold 24.

The closed end 20 of each tube is bent at right angles to the axis thereof as a means of positively spacing the tubes at their closed end and for receipt of a channel member 34 embracing all the closed ends of the tubes for the rigid support thereof.

A baffle plate 36 having two identical half sections 37 is mounted on the clamp member 30 having a plurality of openings 38 therein when assembled together for receipt of the tubes affording a vertical baffling means at the bases of the tubes.

The tubes are normally extended for use in a vertical direction having a plurality of fuel emission openings 40 extending in spaced straight line array axially of the tubes, one row in diametrically opposite sides of the tube, the purpose of which will hereinafter appear.

The thermocouple banks or stacks 14 comprise a plurality of rows 42 of thermocouples 44 formed of continuous welded ribbon stock forming oppositely disposed hot and cold junctions 46 and 48 respectively and curved portions 50 therebetween adapted to receive tubular ceramic members 52 therein of heat and fire resistant quality of a length corresponding to the width of the ribbon stock of which the thermocouples are formed. The thermocouples are made of conventionally used material such as Chromel for the electropositive metal and constantan as the electronegative metal, each of these strips of ribbon metal being joined at the hot and cold junction ends of the thermocouples in alternate fashion.

Each row of thermocouples is spaced vertically apart by tubular ceramic members 54 of heat and fire resistant quality similar to members 52 having larger diameter than members 52 so that the end faces of the curved portions of the thermocouples will bear thereon. The ceramic members because of their predetermined size and relation to one another provide a plurality of air passages 55 extending through the thermocouple banks, the purpose of which will hereinafter appear.

The rows of thermocouples are all stacked vertically with the hot and cold junctions thereof projecting perpendicular thereto in opposite directions to one another such that a plurality of vertical rows of oppositely disposed hot and cold junctions and tubular ceramic members are formed all clamped together as a single unit by a bottom channel and end plate element 56, the bottom channel portion of which receives the lowest tubular ceramic members 54 therein in spaced relation and a top channel member 58 bolted upon the end plate portions of element 56 at ends 60 thereof with the uppermost ceramic members received in spaced relation therein, with studs 62 extending vertically through the vertical rows of alternately arranged ceramic members 52 and 54.

The burner tubes 18, and the pair of thermocouple stacks 14 are all arranged in parallel vertically mounted relation with the burner tubes extending therebetween in predetermined spaced relation having the fuel openings of the tubes positioned so as to direct the flame therefrom when the fuel emitting therefrom is ignited directly at the hot junctions of the thermocouples. The burner tubes are equal in number to the number of vertical rows of hot junctions so that each tube throughout its axial length will provide for the effective heating of the hot junctions juxtaposed thereto.

The burner tubes and thermocouple stacks are secured in predetermined desired vertical array to one another by end plates 64 arranged at the opposite ends thereof extending perpendicularly to the parallel arrangement therebetween by screws or the like 66 inserted through slots 67 in the end plates and threaded into the end plate portions of elements 56 for securing the thermocouple stacks thereto and the burner tube channel member 34 has a pair of fingers 68 on opposite ends thereof bent outwardly into embracing relation against the outer surface of the end plates 64, said ends of the channel member being received in slotted portions 70 of the end plates.

A combustion chamber V-shaped baffle member 72 is supported upon the stacks of thermocouples suspended over a combustion chamber 73 formed by the enclosure of the parallel thermocouple stacks and end plates 64 and is movable vertically on vertically extended support members 74 which are bolted in spaced relation along the top of the thermocouple stacks by nuts fastened to the ends of studs at their uppermost free end.

The draft stack 16 is of generally rectangular shape comprising side and end plates 78 and 80 respectively mounted in predetermined encompassing relation near the top section of the thermocouple stacks upon the end plates 64 and provides a peripheral passage 82 therein around the assembly of the thermocouple stacks, burner tubes and end plates so that an ample supply of draft for the proper rate of combustion in the combustion chamber is obtainable for high efficiency operation of the unit. The height at which the stack 16 is positioned relative to the thermocouple stacks and burner tube depends on conditions of use, fuel to be burned and desired operation thereof.

Primary air for combustion chamber 73 is supplied thereto along baffle plate 36 between said plate and the bottom channel portions of element 56 of the thermocouple banks and secondary air is supplied through the air passages 55 which are distributed throughout the height and width of the thermocouple bank extending from the exterior surface thereof to the interior surface adjacent combustion chamber 73.

One end of plates 64 for the purpose of providing a rigid framework for the support of the thermocouple banks is secured to the manifold 24 through the receipt of an open end 84 of the manifold in an opening 86 near the bottom thereof for the bolting thereof between a flange 88 of the manifold and a flange 90 of a Venturi tube 92 arranged in communicating relation to the open end of the manifold.

The other end plate 64 oppositely disposed to the one associated with the open end 84 of the manifold is bolted upon the closed end 94 of the manifold near its bottom similarly to the end plate 64 at the opposite end of the manifold. The end plates 64 each are provided with horizontal flanges 96 providing a standard for the generator.

The Venturi tube 92 is provided at one end 98 thereof oppositely disposed to the end mounted upon the manifold with a fuel supply orifice mechanism 100 for the supply of fuel to the venturi for subsequent delivery to the burner manifold. As shown, the burner orifice is axially movable to the Venturi tube for the control of air inlet openings 102 provided at end 98 of the venturi.

Each row of thermocouples are joined at one end terminus A to the next higher row of thermocouples at terminus B for the series connection thereof in each stack by electrical conductor bars or the like 104 with the terminus A of the uppermost row of thermocouples of each stack connected by an electrical lead 106 to an electrical connection means 108 having spaced electrical posts 110 directly connected one with each of the electrical leads 106, a central post 112 adapted to be connected with the posts 110 by electrical conductor links 114 for the series operation of the generator and a pair of spaced posts 116 adapted to be connected independently to the respective posts 110 by links 114 for the parallel operation of the generator.

The terminus A of the lowermost row of thermocouples of each stack in completing the circuit for the proper series and parallel connections thereof is connected by a lead 117 to one of the posts 116.

In the general assembly of the generator the tubes 18 are first inserted into the openings 28 in the manifold and are sealed at their juncture by a suitable form of cement or the like 118 so as to prevent the escape of fuel therearound and the half sections of clamp member 30 are then secured to the manifold with the cooperative openings 32 formed therebetween having the tubes therein such that the inner face of the clamp members bear upon the ribs 26 of the tubes to hold them in firm assembly upon the manifold. The baffle plate 36 is next slipped around the bottom portions of the tube similarly to clamp member 36 for the purpose of affording a baffle enclosure at the base of the combustion chamber of the generator unit. The channel member 34 is next slipped over the closed ends 20 of the tubes and is crimped or otherwise suitably impressed around the closed ends to hold same therein in assembly and thus form a rigid unitary structure of the burner tubes with the free fingers 68 on the opposite ends of the channel extending axially outwardly thereof.

With the assembly of the burner tubes in their entirety the end plates 64 are securely bolted to the manifold with the Venturi tube 92 in place on the end plates and manifold. In the assembly of the end plates in vertically mounted position the free fingers 68 on opposite ends of the channel 34 are received in slots 70 in the end plates and bent back over to lock the burner tubes in their channel member 34 at their upper end.

The thermocouple banks or stacks 14 being unitary in structure comprising the several rows of thermocouples, ceramic tubes, bottom channel and side plate element, top channel and studs are assembled apart from the other structure of the generator hereinbefore defined in stages of assembly for subsequent assembly thereto wherein the separate banks are arranged in vertical parallel array to one another and the burner tubes and secured in predetermined spaced relation to the burner tubes by the insertion of screws 66 through slots 67 in the end plates for firmly securing the stacks thereto. The slots 67 are provided so that the banks can be properly moved or spaced within predetermined limits closer to or away from the burner tubes such that a proper and equal spacing thereof is attainable although in conditions where the spacing is predetermined no allowable adjustment will be necessary. The baffle member 72 can next be mounted upon the vertical support members applied to the studs of the thermocouple bank assembly if not placed therein prior to the mounting of the banks to the ends plates and adjusted to preferred operating height for the generator. The draft stack 16 is next mounted upon the end plates in enclosing relation to the top portions thereof and the thermocouple banks and with the proper connecting of the terminals of the thermocouples to the connector means 108 and the ignition of the fuel supplied to the manifold and burner tubes the generator is placed in operation for the thermoelectric generation of electricity the use to which the electricity is made from connector posts 116 being dependent on the apparatus to which it is applied.

Figures 2, 3:
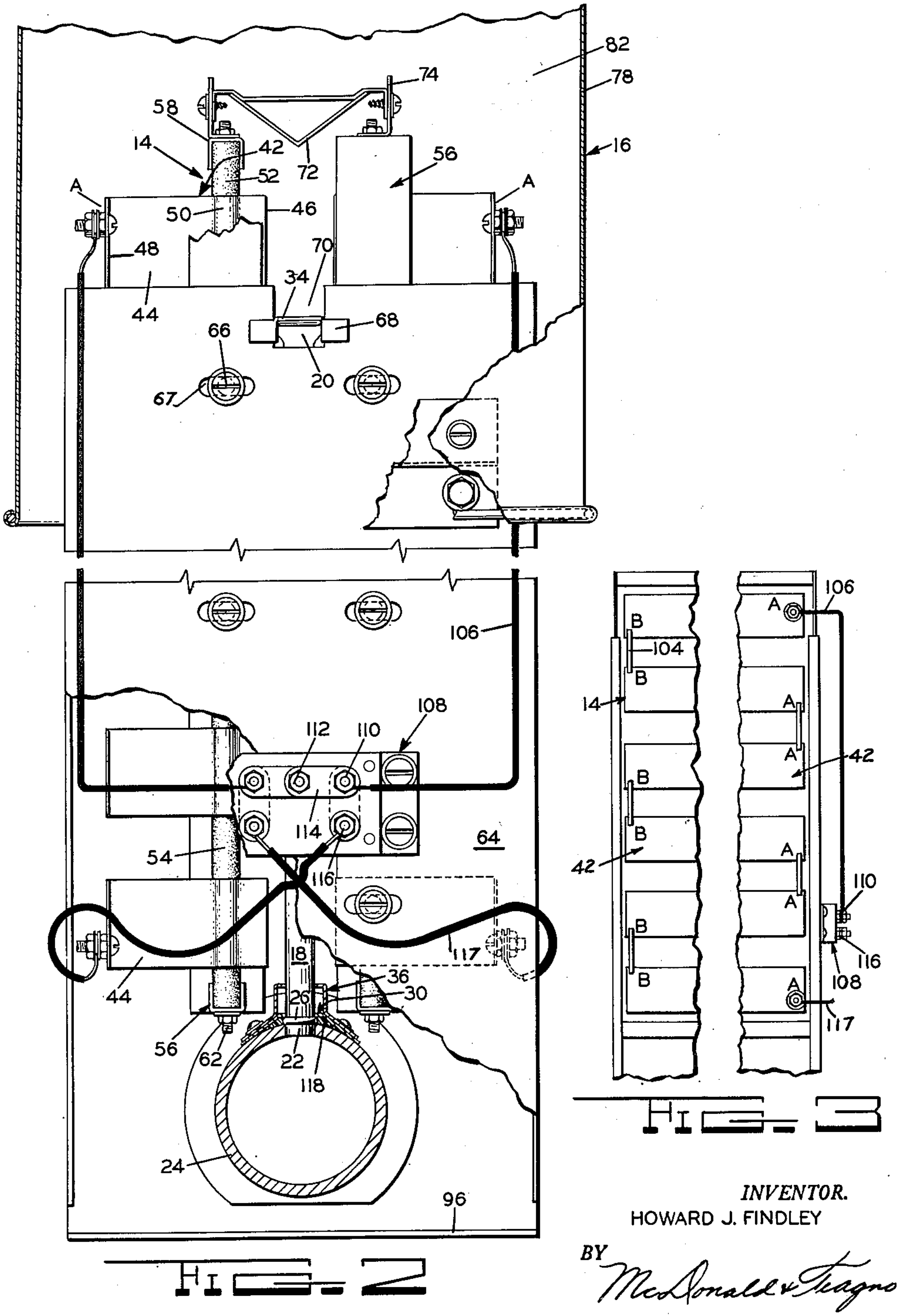
Fig. 2 is an end elevation view of the generator shown fragmentarily with portions thereof broken away and other portions in section.
Fig. 3 is a schematic illustration of the electric conductor bar tie in relation to the rows of thermocouple elements.
Figure 4:
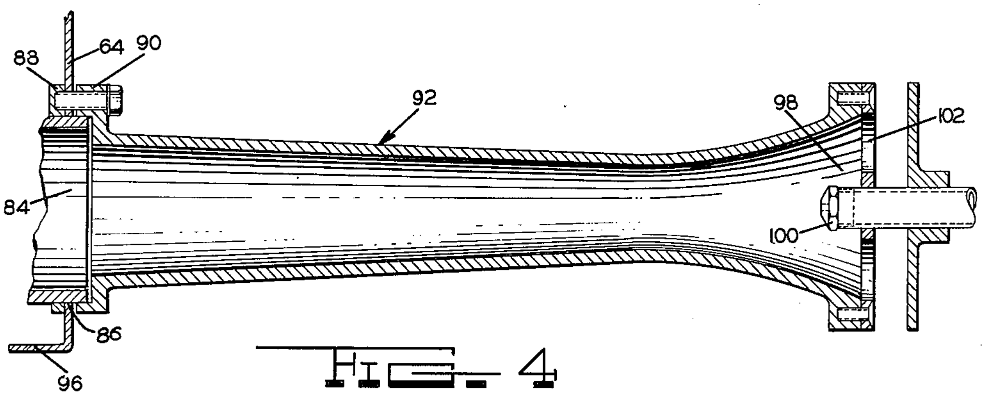
Fig. 4 is a vertical cross-sectional view of the fuel apparatus Venturi feed tube.
Figure 5:
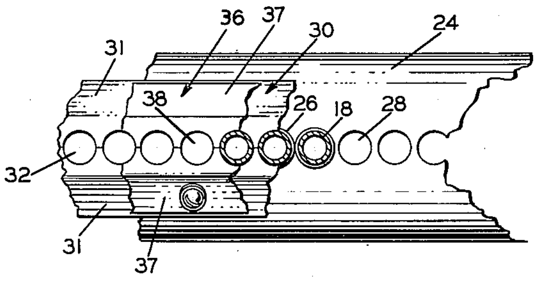
Fig. 5 is a fragmentary top elevation view of the burner tubes and manifold assembly with portions broken away and other portions in section.
Figure 6:
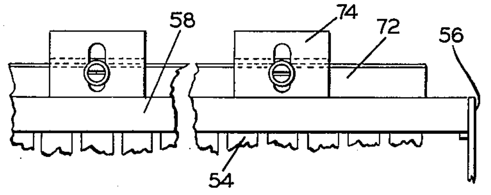
Fig. 6 is a fragmentary side elevation view of the combustion chamber baffle in assembly on the thermocouple banks.
Figure 7:
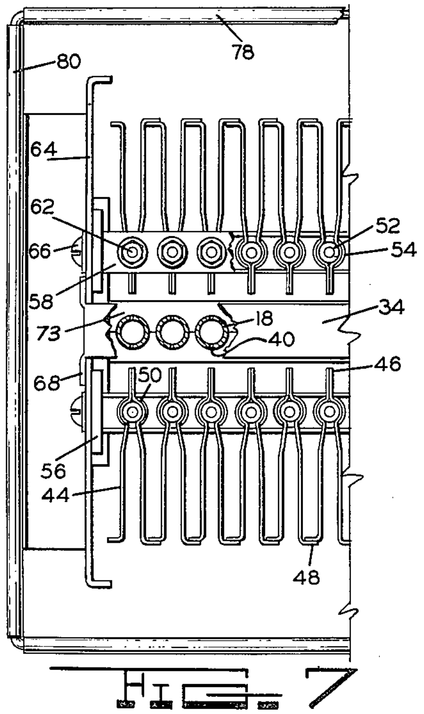
Fig. 7 is a fragmentary top elevation view of the thermoelectric generator of Fig. 1 with portions broken away and other portions in section.
Figures 8, 12:
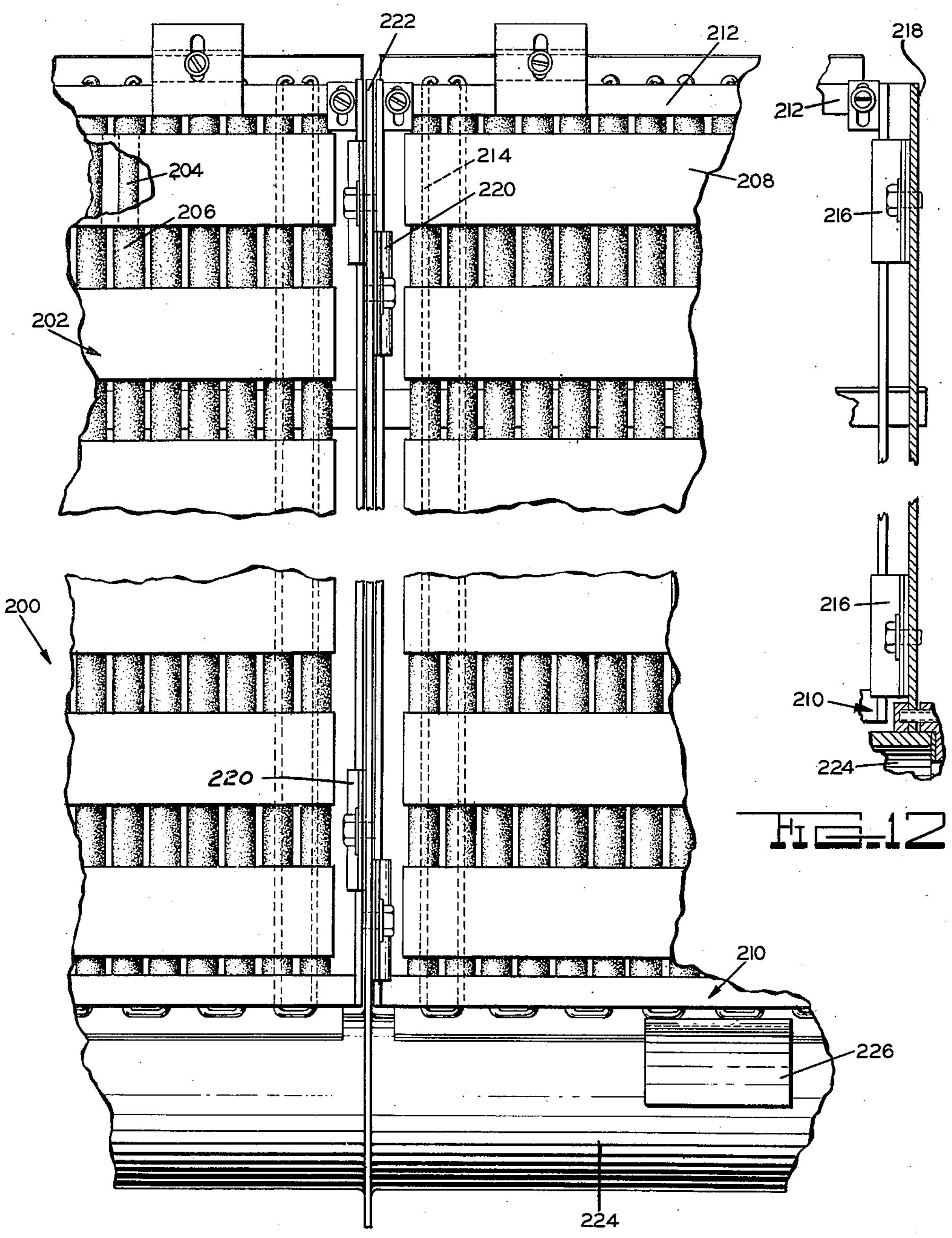
Fig. 8 is a fragmentary side elevation view of a modified form of thermoelectric generator with portions thereof broken away and other portions incomplete.
Fig. 12 is a fragmentary side elevation view of the thermocouple banks of the thermoelectric generator of Fig. 8 illustrating its relation to its end support plate.
Figure 9:
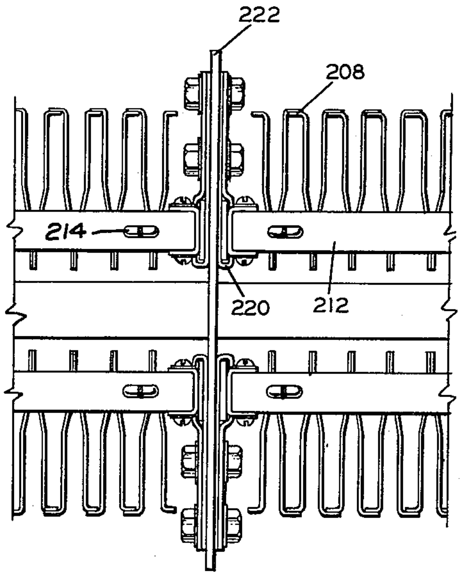
Fig. 9 is a fragmentary top elevation view of the thermocouple banks of the thermoelectric generator of Fig. 8, emphasizing the structure thereof relative to its center support plate.
Figure 11:
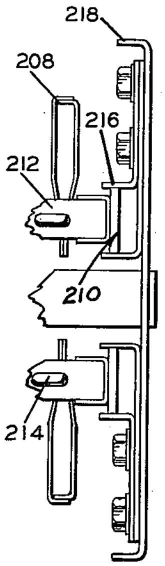
Fig. 11 is a fragmentary top elevation view of the thermocouple banks of the thermoelectric generator of Fig. 8, illustrating the structure thereof relative to its end support plate.
Figure 10:
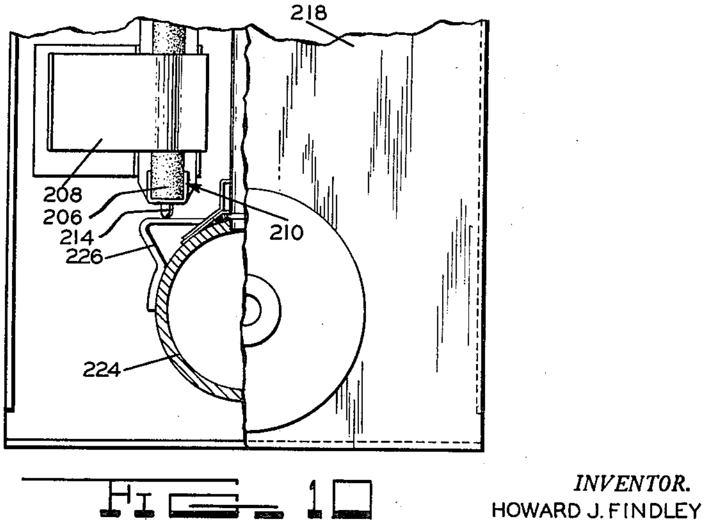
Fig. 10 is a fragmentary end elevation view of the lower portion of the thermoelectric generator of Fig. 8 with portions thereof broken away and other portions in sections.

Fig. 8 through Fig. 12 illustrate a modified form of the invention shown by Fig. 1 through Fig. 7 particularly with regard to the provision of a thermoelectric generator 200, of basic likeness to generator 10 but differing materially therefrom, in the supporting of the thermocouple banks 202 thereof. The banks 202 are four in number as compared to the pair in generator 10 inasmuch as it has been determined necessary with regards to generators that are required to be of a certain predetermined length or longer to provide a plurality of thermocouple banks and afford a substantial supporting framework therefor to account for expansion, tendency to warp, etc., of the banks for the continual effective operation thereof.

The banks 202 are made likewise of a unitary structure as banks 14 of generator 10 and each comprise a plurality of vertical rows of heat and fire resistant members 204 and 206 supporting horizontal rows of thermocouples 208, secured together as by a U-shaped combination bottom channel and end plate member 210 and a top channel member 212 with U-shaped clips 214 having the legs thereof extending vertically through the members 204 and 206, and channel members 210 and 212 with their free ends turned over to effect a clamping action thereon. The end plate portions of members 210 are adapted to be fitted for sliding engagement in vertically spaced track members 216 mounted on vertically disposed end plates 218 forming the end enclosures for the generator 200 per se at one end thereof and at their other end on spaced track members 220 mounted upon opposite sides of a common vertically disposed center plate 222. The end plate portion of the members 210 associated with track members 220 are adapted to fit snugly therein but the other end plate portion of members 210 associated with track members 216 are afforded end clearance therein permitting of the necessary expansions of the thermocouple banks when heated.

The end plates 218 and center plate 222 are supported in parallel vertically disposed array on a fuel distributing manifold 224.

The track members 216 and 220 afford an effective vertical support of the thermocouple banks while at the same time permitting of ease in the removal of the thermocouple banks for servicing or replacement.

Inasmuch as the track members 216 and 220 solely support the banks from sideways displacement, a plurality of shelf members 226 are provided fixedly secured to the fuel distributing manifold 224 for the generator, said banks 202 when in assembled position having the ends of clips 214 resting upon the shelf members 226 at horizontally spaced points corresponding to the spacing of the shelf members upon the manifold 224.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a thermoelectric generator, a frame having upright end walls, spaced-apart substantially parallel upright thermopiles extending between said end walls and carrying banks of thermocouple elements having hot junctions on the adjacent sides of said thermopiles and cold junctions on the remote sides, and fuel burning means disposed between said thermopiles and being substantially longitudinally coextensive with the thermocouple banks and operable to supply heat to said hot junctions, said thermopiles having a plurality of like equi-spaced air passages extending therethrough from the remote to the adjacent sides thereof for admitting combustion air to the fuel burning means.

2. In a thermoelectric generator, a frame having upright end walls, spaced-apart substantially parallel upright thermopiles extending between said end walls and carrying banks of thermocouple elements having hot junctions on the adjacent sides of said thermopiles and cold junctions on the remote sides, and fuel burning means disposed between said thermopiles and being substantially longitudinally coextensive with the thermocouple banks and operable to supply heat to said hot junctions, said thermopiles being preformed unitary structures removably supported by said frame and having their ends detachably engaged with said end walls and said thermopiles also having a plurality of like equi-spaced air passages extending horizontally therethrough from the remote to the adjacent sides thereof for admitting combustion air to the fuel burning means.

3. In a thermoelectric generator, a frame having upright end walls and an upright intermediate wall at a point between said end walls, spaced-apart substantially parallel paired upright thermopiles extending between said intermediate wall and said end walls and carrying banks of thermocouple elements having hot junctions on the adjacent sides of said thermopiles and cold junctions on the remote sides, fuel burning means disposed between said thermopiles and being substantially longitudinally coextensive with the thermocouple banks and operable to supply heat to said hot junctions, said thermopiles being preformed unitary structures supported on said frame and having their ends detachably connected with said intermediate and end walls.

4. In a thermoelectric generator, a frame having upright substantially parallel walls, a plurality of substantially parallel upright thermopiles supported between said walls in perpendicular relation thereto each including a plurality of horizontal rows of thermocouple elements, mounted upon a sectionally built up and dismantleable member, providing hot junctions extending from one face of the member and cold junctions extending from its opposite face, and fuel burning means disposed between spaced apart thermopiles having the hot junctions of their thermocouple elements disposed toward one another and being substantially longitudinally coextensive with the thermopiles, operable to supply heat to the hot junctions of the thermocouple elements, said member having openings extending therethrough providing communication between the hot and cold junction sides thereof.

5. A thermoelectric generator comprising two substantially parallel, vertically disposed end plates, a pair of substantially parallel vertically disposed and spaced apart thermocouple banks supported on the end plates in perpendicular array thereto, each comprising a plurality of vertically disposed rows of heat and fire resistant tubular members of alternate larger and smaller diameter in each row, a plurality of thermocouples mounted on said smaller diameter tubular members as to lie in substantially vertical and horizontal rows, and a rectangular framework supporting the tubular members and thermocouples in a unit, the hot junctions of the thermocouples on each bank extending toward each other and the cold junctions thereof extending away from each other, and means disposed centrally of the thermocouple banks for heating the hot junctions.

6. A thermoelectric generator comprising two substantially parallel, vertically disposed end plates, a pair of substantially parallel vertically disposed and spaced apart thermocouple banks supported on the end plates in perpendicular array thereto, each comprising a plurality of vertically disposed rows of heat and fire resistant tubular members of alternate larger and smaller diameter in the vertical disposition thereof, a plurality of thermocouples mounted in continuous horizontal array upon the smaller diametered tubular members vertically intermediate the larger diametered tubular members so as to provide a plurality of substantially vertical and horizontal rows of hot junctions extending toward each other and cold junctions extending away from one another and hot junction heating means centrally disposed between the thermocouple banks.

7. A thermoelectric generator comprising a burner apparatus including a manifold distributor and a plurality of burner tubes having communication therewith mounted thereupon and extended substantially vertically therefrom, a pair of substantially parallel vertically disposed end plates mounted on the manifold, and a pair of substantially parallel vertically disposed and spaced apart thermocouple banks supported on the end plates in perpendicular array thereto providing with the end plates a peripheral enclosure for the burner tubes each bank comprising a plurality of vertically disposed rows of heat and fire resistant members, a plurality of horizontal rows of thermocouples mounted on the heat and fire resistant members each row separated from the other by a horizontal row of heat and fire resistant members, one in each row to each row of heat and fire resistant members so as to provide a plurality of substantially vertical and horizontal rows of hot junctions extending toward the burner tubes and a plurality of substantially vertical and horizontal rows of oppositely disposed cold junctions extending away from the burner tubes.

8. A thermoelectric generator comprising two substantially parallel, vertically disposed end plates, a pair of substantially parallel vertically disposed and spaced apart thermocouple banks supported on the end plates in perpendicular array thereto, each comprising a plurality of vertically disposed rows of heat and fire resistant tubular members, a plurality of thermocouples mounted on said tubular members as to lie in substantially vertical and horizontal rows, and a rectangular framework supporting the tubular members and thermocouples in a unit, and hot junctions of the thermocouples on each bank extending toward each other and the cold junctions thereof extending away from each other and a vertically adjustable baffle means for the heating means supported between the thermocouple banks disposed above the heating means.

9. A thermoelectric generator comprising two substantially parallel, vertically disposed end plates, a pair of substantially parallel vertically disposed and spaced apart thermocouple banks supported on the end plates in perpendicular array thereto, each comprising a plurality of vertically disposed rows of heat and fire resistant tubular members, a plurality of thermocouples mounted on said tubular members as to lie in substantially vertical and horizontal rows, and a rectangular framework supporting the tubular members and thermocouples in a unit, and hot junctions of the thermocouples on each bank extending toward each other and the cold junctions thereof extending away from each other and a draft stack supported on the end plates enclosing in a vertical direction the upper portions of the thermocouple banks.

10. A thermoelectric generator comprising a burner apparatus including a tubular fuel distributing manifold, and a plurality of vertically disposed burner tubes arranged in a single row on the manifold having communication interiorly of the manifold and each having a plurality of fuel emission openings extending throughout the vertical height of the tubes, a pair of substantially parallel vertically disposed end plates mounted on the manifold extending in a plane perpendicular to the row of burner tubes, and a pair of substantially parallel vertically disposed thermocouple banks mounted upon the end plates perpendicularly thereto with the burner tubes disposed therebetween each bank comprising a plurality of vertically disposed and vertical passage spaced apart heat and fire resistant members, a plurality of horizontal rows of thermocouples mounted in vertical spaced relation on the heat and fire resistant members providing a plurality of vertical and horizontal rows of hot junctions, with the hot junctions of each bank disposed toward each other and the burner tubes and a plurality of vertical and horizontal rows of the cold junctions of each bank disposed away from one another and the burner tubes.

11. A thermoelectric generator comprising a burner apparatus including a hollow fuel distributing manifold and a plurality of vertically disposed and spaced apart burner tubes mounted in single row array on the manifold having communication therewith, a pair of end plates mounted on the manifold at opposite ends of the rows of burners, and a pair of substantially parallel vertically disposed thermocouple banks supported on the end plates in parallel relation to the burner tubes with the burner tubes therebetween, each bank comprising a plurality of vertical rows of heat and fire resistant members, each row including two sizes of members of alternately smaller and larger diameter throughout the vertical height of each row, a plurality of horizontal rows of thermocouples, each thermocouple being mounted upon the smaller diametered heat and fire resistant members vertically intermediate the larger diametered members providing a plurality of substantially vertically and horizontally disposed rows of hot and cold junctions, the hot junctions of each bank extending toward one another and the burner tubes and the cold junctions extending away from one another.

12. A thermoelectric generator comprising a burner apparatus including a hollow fuel distributing manifold and a plurality of vertically disposed and spaced apart burner tubes mounted in single row array on the manifold having communication therewith, a pair of end plates mounted on the manifold at opposite ends of the rows of burners, and a pair of substantially parallel vertically disposed thermocouple banks supported on the end plates in parallel relation to the burner tubes with the burner tubes therebetween, each bank comprising a plurality of vertical rows of heat and fire resistant tubular members, each row including alternately arranged tubular members of two different diameters, a plurality of horizontal rows of thermocouples, each thermocouple thereof having embracing mounted relation on the smaller diametered tubular members vertically intermediate the larger diametered tubular members and means for securing the tubular members and thermocouples together as a unit, said thermocouples providing a plurality of vertical and horizontal rows oppositely extended hot and cold junctions with the hot junctions of each bank extending toward one another and the cold junctions of each bank extending away from one another.

13. A thermoelectric generator comprising a burner apparatus including a hollow fuel distributing manifold and a plurality of vertically disposed and spaced apart burner tubes mounted in single row array on the manifold having communication therewith, a pair of end plates mounted on the manifold at opposite ends of the rows of burners, a pair of substantially parallel vertically disposed thermocouple banks supported on the end plates in parallel relation to the burner tubes with the burner tubes therebetween, each bank comprising a plurality of vertical rows of heat and fire resistant tubular members, each row including alternately arranged tubular members of two different diameters, a plurality of horizontal rows of thermocouples, each thermocouple thereof having embracing mounted relation on the smaller diametered tubular members vertically intermediate the larger diametered tubular members, and means for securing the tubular members and thermocouples together as a unit, said thermocouples providing a plurality of vertical and horizontal rows of oppositely extended hot and cold junctions with the hot junctions of each bank extending toward one another and the cold junctions of each bank extending away from one another, a peripheral enclosure mounted on the end plates having peripheral clearance around the end plates and cold junctions of the thermocouples, and a baffle member mounted on the top of the thermocouple banks in suspended relation over the space provided between the banks.

14. A thermoelectric generator comprising a burner apparauts including a hollow, fuel distributing manifold and a plurality of vertically disposed and spaced apart burner tubes mounted in single row array on the manifold having communication therewith, a plurality of substantially parallel vertically disposed thermocouple banks comprising a plurality of horizontal rows of thermocouples mounted on heat and fire resistant members and secured together as a unit providing air passage openings horizontally therethrough, said thermocouples providing a plurality of vertical and horizontal rows of oppositely extended hot and cold junctions with the hot junctions of each bank extending toward one another and the cold junctions extending away from one another, and vertically disposed plates fixedly secured to the manifold supporting the thermocouple banks in spaced vertical arrangement to one another with the burner tubes disposed parallel therebetween.

15. In a thermoelectric generator, a frame having upright end walls, spaced apart substantially parallel upright thermopiles extending between said end walls and carrying banks of thermocouple elements having hot junctions on the adjacent sides of said thermopiles and cold junctions on the remote sides and having openings therethrough providing communication between the hot and cold junction sides thereof, and fuel burning means comprising a hollow fuel distributing manifold connected at its opposite ends to the end walls, a plurality of burner tubes disposed between said thermopiles in single row array substantially longitudinally coextensive therewith having communication at one end with the manifold and operable to supply heat to the hot junctions of the thermocouple elements and a channel member mounted upon the end walls supporting the free ends of the burner tubes in line array.

16. A thermocouple bank of generally rectangular shape comprising a plurality of vertical rows of heat and fire resistant members, a plurality of horizontal rows of thermocouples mounted on the heat and fire resistant members providing a plurality of vertical and horizontal rows of hot and cold junctions extended opposite to one another, and means securing the heat and fire resistant members and thermocouples as a unit said rows of thermocouples and heat and fire resistant members in their assembled relation providing a plurality of equi-spaced air passages extending therethrough between the hot and cold junction sides of the thermocouples.

17. In a thermoelectric generator, a fuel distributing apparatus comprising a horizontally arranged manifold and a plurality of vertically disposed in line burner tubes mounted on the manifold having communication therewith, spaced vertically disposed walls mounted on the manifold lying in a plane perpendicular to the in line arrangement of the burner tubes, said walls having vertically arranged channel sections on the opposed inner faces thereof, and spaced apart substantially parallel paired upright thermopiles slidably received in the channel sections and supported vertically on the manifold with the burner tubes parallely disposed therebetween carrying a plurality of thermocouple elements having hot junctions on the adjacent sides of said thermopiles and cold junctions on the remote sides.

18. A thermoelectric generator comprising a plurality of substantially parallel vertically disposed and spaced apart thermopile banks, each comprising a plurality of vertically disposed rows of heat and fire resistant tubular members of alternate larger and smaller diameters in the vertical disposition thereof and a plurality of thermocouples mounted in continuous horizontal array upon the smaller diameter tubular members vertically intermediate the larger diameter tubular members so as to provide a plurality of substantially vertical and horizontal rows of hot junctions extending towards each other and cold junctions extending away from one another, a plurality of substantially parallel vertically disposed plates arranged perpendicular to the thermocouple banks for supporting the parallel arrangement of the banks in spaced relation to one another, and fuel burning means disposed between the hot junctions of the thermocouples to heat same.

HOWARD J. FINDLEY.

REFERENCES CITED

The following references are of record in the file of this patent:

UNITED STATES PATENTS

| Number | Name | Date |
|---|---|---|
| 394,090 | Woodward | Dec. 4, 1888 |
| 874,780 | Marsh | Dec. 24, 1907 |

FOREIGN PATENTS

| Number | Country | Date |
|---|---|---|
| 173,185 | France | Dec. 28, 1885 |

OTHER REFERENCES

Milnes, Thermoelectric Catalog, 1938.